United States Patent
Kawamoto et al.

(10) Patent No.: US 12,183,960 B2
(45) Date of Patent: Dec. 31, 2024

(54) CATALYST LAYER, CATALYST LAYER FORMING LIQUID AND MEMBRANE ELECTRODE ASSEMBLY

(71) Applicant: AGC Inc., Tokyo (JP)

(72) Inventors: Masako Kawamoto, Tokyo (JP); Satoru Hommura, Tokyo (JP)

(73) Assignee: AGC Inc., Tokyo (JP)

( * ) Notice: Subject to any disclaimer, the term of this patent is extended or adjusted under 35 U.S.C. 154(b) by 406 days.

(21) Appl. No.: 17/304,879

(22) Filed: Jun. 28, 2021

(65) Prior Publication Data

US 2021/0328247 A1   Oct. 21, 2021

Related U.S. Application Data

(63) Continuation of application No. PCT/JP2020/000254, filed on Jan. 8, 2020.

(30) Foreign Application Priority Data

Jan. 8, 2019   (JP) ................................. 2019-001000

(51) Int. Cl.
*H01M 8/1039* (2016.01)
*H01M 4/92* (2006.01)
(Continued)

(52) U.S. Cl.
CPC ......... *H01M 8/1039* (2013.01); *H01M 4/925* (2013.01); *H01M 8/1004* (2013.01);
(Continued)

(58) Field of Classification Search
CPC .. H01M 8/1039; H01M 4/925; H01M 8/1004; H01M 8/1025; H01M 2008/1095;
(Continued)

(56) References Cited

FOREIGN PATENT DOCUMENTS

| | | | |
|---|---|---|---|
| CN | 102473473 A | 5/2012 | |
| JP | 2001-522376 | * 11/2001 | ........... C07C 311/48 |

(Continued)

OTHER PUBLICATIONS

Dickman et al., A review of recent study is on toxicity, sequestration, and degradation of per- and polyfluoroalkyl substances, Journal of Hazardous Materials 436 (2022) 129120 (Year: 2022).*

(Continued)

*Primary Examiner* — Helen Oi K Conley
(74) *Attorney, Agent, or Firm* — Element IP, PLC (57) ABSTRACT

To provide a catalyst layer, a catalyst layer forming liquid, and a membrane electrode assembly, capable of forming a fuel cell excellent in power generation efficiency.

The catalyst layer of the present invention comprises a supported catalyst having a carrier containing a metal oxide and a catalyst supported on the carrier; and a polymer having at least one type of units containing a cyclic ether structure, selected from the group consisting of units (u11), units (u12), units (u21) and units (u22), and having an ion-exchange group, wherein the total of the content of the units containing a cyclic ether structure is at least 30 mol % to all units which the polymer contains:

(u11)

(Continued)

-continued (u12)

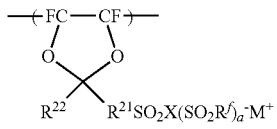

(u21)

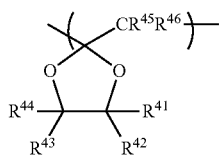

(u22)

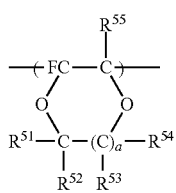

(51) Int. Cl.
  *H01M 8/10* (2016.01)
  *H01M 8/1004* (2016.01)
  *H01M 8/1025* (2016.01)

(52) U.S. Cl.
  CPC .. *H01M 8/1025* (2013.01); *H01M 2008/1095* (2013.01); *H01M 2300/0082* (2013.01)

(58) Field of Classification Search
  CPC ........ H01M 2300/0082; H01M 4/8668; Y02E 60/50
  See application file for complete search history.

(56) References Cited

FOREIGN PATENT DOCUMENTS

JP  6315018 B2 *  4/2018  .......... H01M 4/8663
WO  WO-2004097851 A1 *  11/2004  ............ C08F 214/18

OTHER PUBLICATIONS

International Search Report issued Mar. 31, 2020 in PCT/JP2020/000254 filed on Jan. 8, 2020, 3 pages.

\* cited by examiner

9 Claims, 1 Drawing Sheet

Fig. 1

CATALYST LAYER, CATALYST LAYER FORMING LIQUID AND MEMBRANE ELECTRODE ASSEMBLY

TECHNICAL FIELD

The present invention relates to a catalyst layer, a catalyst layer forming liquid and a membrane electrode assembly.

BACKGROUND ART

Heretofore, a fuel cell has had a catalyst layer (catalyst layer of an electrode which a membrane electrode assembly has) comprising a supported catalyst having platinum or a platinum alloy supported on a carbon carrier, and a polymer (ionomer), but has had a problem that the carbon carrier is susceptible to corrosion. Therefore, it has been studied to use a metal oxide as a carrier instead of a carbon carrier.

Patent Document 1 discloses a catalyst layer for a fuel cell, which comprises a catalyst composite (supported catalyst) having platinum or a platinum alloy supported on the surface of a $SnO_2$ carrier, and a perfluorosulfonic acid polymer (ionomer) containing acidic functional groups and cyclic groups.

PRIOR ART DOCUMENT

Patent Document

Patent Document 1: Japanese Patent No. 6315018

DISCLOSURE OF INVENTION

Technical Problem

In recent years, further improvement in power generation efficiency of a fuel cell has been required.

The present inventors have evaluated a catalyst layer comprising a supported catalyst having a carrier of a metal oxide, and an ionomer (polymer) having a cyclic structure, as described in Patent Document 1, and, as a result, it has been found that the power generation efficiency of the fuel cell may sometimes be insufficient depending on the type and content of the cyclic structure.

In view of the above circumstances, it is an object of the present invention to provide a catalyst layer, a catalyst layer forming liquid and a membrane electrode assembly, capable of forming a fuel cell excellent in power generation efficiency.

Solution to Problem

As a result of diligent studies on the above problem, the present inventors have found it possible to obtain a fuel cell excellent in power generation efficiency, if in a catalyst layer comprising a supported catalyst having a carrier containing a metal oxide and a polymer having ion exchange groups, the polymer has units containing a specific cyclic ether structure, and the total of the content of the units containing a specific cyclic ether structure is at least a specific amount to all units which the polymer contains, and thus, they have arrived at the present invention.

That is, the present inventors have found that the above problem can be solved by the following constructions.

[1] A catalyst layer comprising a supported catalyst having a carrier containing a metal oxide, and a catalyst supported on the carrier, and a polymer having at least one type of units containing a cyclic ether structure, selected from the group consisting of units represented by the formula (u11) as described later, units represented by the formula (u12) as described later, units represented by the formula (u21) as described later and units represented by the formula (u22) as described later, and having ion exchange groups, wherein the total of the content of the units containing a cyclic ether structure is at least 30 mol % to all units which the polymer contains:

in the formula (u11) as described later, $R^{11}$ is a divalent perfluoroorganic group which may have an ether-bonding oxygen atom, and $R^{12}$, $R^{13}$, $R^{15}$ and $R^{16}$ are each independently a monovalent perfluoroorganic group which may have an ether-bonding oxygen atom, or a fluorine atom, $R^{14}$ is a monovalent perfluoroorganic group which may have an ether-bonding oxygen atom; a fluorine atom; or a group represented by $-R^{11}(SO_2X(SO_2R^f)_a)^-M^+$, where $M^+$is $H^+$, a monovalent metal cation, or an ammonium ion in which at least one hydrogen atom may be substituted by a hydrocarbon group, and $R^f$ is a linear or branched perfluoroalkyl group which may have an ether-bonding oxygen atom, X is an oxygen atom, a nitrogen atom, or a carbon atom, and when X is an oxygen atom, a=0, when X is a nitrogen atom, a=1, and when X is a carbon atom, a=2;

in the formula (u12) as described later, $R^{21}$ is a $C_{1-6}$ perfluoroalkylene group, or a $C_{2-6}$ perfluoroalkylene group having an ether-bonding oxygen atom between carbon-carbon bonds, and $R^{22}$ is a fluorine atom, a $C_{1-6}$ perfluoroalkyl group, a $C_{2-6}$ perfluoroalkyl group having an ether-bonding oxygen atom between carbon-carbon bonds, or a group represented by $-R^{21}(SO_2X(SO_2R^f)_a)^-M^+$, where $M^+$, $R^f$ and X are the same as above;

in the formula (u21) as described later, $R^{41}$, $R^{42}$, $R^{43}$, $R^{44}$, $R^{45}$ and $R^{46}$ are each independently a monovalent perfluoroorganic group which may have ether-bonding oxygen atom, or a fluorine atom;

in the formula (u22) as described later, s is 0 or 1, $R^{51}$ and $R^{52}$ are each independently a fluorine atom, a $C_{1-5}$ perfluoroalkyl group, or a spiro ring formed by linking with each other (provided in the case where s is 0), $R^{53}$ and $R^{54}$ are each independently a fluorine atom, or a $C_{1-5}$ perfluoroalkyl group, and $R^{55}$ is a fluorine atom, a $C_{1-5}$ perfluoroalkyl group, or a $C_{1-5}$ perfluoroalkoxy group.

[2] The catalyst layer according to [1], wherein the units containing a cyclic ether structure include the units represented by the formula (u22).

[3] The catalyst layer according to [2], wherein the units containing a cyclic ether structure further include at least one of the units represented by the formula (u11) and the units represented by the formula (u12).

[4] The catalyst layer according to any one of [1] to [3], wherein the polymer further contains units based on a perfluoromonomer, and the units based on a perfluoromonomer are units not containing a cyclic ether structure and having an ion exchange group.

[5] The catalyst layer according to any one of [1] to [4], wherein the polymer further contains units based on tetrafluoroethylene.

[6] A catalyst layer forming liquid comprising a supported catalyst having a carrier containing a metal oxide, and a catalyst supported on the carrier, a polymer having at least one type of units containing a cyclic ether structure, selected from the group consisting of units represented by the formula (u11) as described later, units represented by the formula (u12) as described later, units represented by the formula (u21) as described later and units represented by the formula (u22) as described later, and having ion exchange groups, and a solvent, wherein the total of the content of the units containing a cyclic ether structure is at least 30 mol % to all units which the polymer contains:

in the formula (u11) as described later, $R^{11}$ is a divalent perfluoroorganic group which may have an ether-bonding oxygen atom, and $R^{12}$, $R^{13}$, $R^{15}$ and $R^{16}$ are each independently a monovalent perfluoroorganic group which may have an ether-bonding oxygen atom, or a fluorine atom, $R^{14}$ is a monovalent perfluoroorganic group which may have an ether-bonding oxygen atom; a fluorine atom; or a group represented by $-R^{11}(SO_2X(SO_2R^f)_{=a})^-M^+$, where $M^+$ is $H^+$, a monovalent metal cation, or an ammonium ion in which at least one hydrogen atom may be substituted by a hydrocarbon group, and $R^f$ is a linear or branched perfluoroalkyl group which may have an ether-bonding oxygen atom, X is an oxygen atom, a nitrogen atom, or a carbon atom, and when X is an oxygen atom, a=0, when X is a nitrogen atom, a=1, and when X is a carbon atom, a=2;

in the formula (u12) as described later, $R^{21}$ is a $C_{1-6}$ perfluoroalkylene group, or a $C_{2-6}$ perfluoroalkylene group having an ether-bonding oxygen atom between carbon-carbon bonds, and $R^{22}$ is a fluorine atom, a $C_{1-6}$ perfluoroalkyl group, a $C_{2-6}$ perfluoroalkyl group having an ether-bonding oxygen atom between carbon-carbon bonds, or a group represented by $-R^{21}(SO_2X(SO_2R^f)_a)^-M^+$, where $M^+$, $R^f$ and X are the same as above;

in the formula (u21) as described later, $R^{41}$, $R^{42}$, $R^{43}$, $R^{44}$, $R^{45}$ and $R^{46}$ are each independently a monovalent perfluoroorganic group which may have ether-bonding oxygen atom, or a fluorine atom;

in the formula (u22) as described later, s is 0 or 1, $R^{51}$ and $R^{52}$ are each independently a fluorine atom, a $C_{1-5}$ perfluoroalkyl group, or a spiro ring formed by linking with each other (provided in the case where s is 0), $R^{53}$ and $R^{54}$ are each independently a fluorine atom, or a $C_{1-5}$ perfluoroalkyl group, and $R^{55}$ is a fluorine atom, a $C_{1-5}$ perfluoroalkyl group, or a $C_{1-5}$ perfluoroalkoxy group.

[7] The catalyst layer forming liquid according to [6], wherein the units containing a cyclic ether structure include the units represented by the formula (u22).

[8] The catalyst layer forming liquid according to [7], wherein the units containing a cyclic ether structure further include at least one of the units represented by the formula (u11) and the units represented by the formula (u12).

[9] The catalyst layer forming liquid according to any one of [6] to [8], wherein the polymer further has units based on a perfluoromonomer, and the units based on a perfluoromonomer are units not containing a cyclic ether structure and having an ion exchange group.

[10] The catalyst layer forming liquid according to any one of [6] to [9], wherein the polymer further contains units based on tetrafluoroethylene.

[11] A membrane electrode assembly having an anode having a catalyst layer, a cathode having a catalyst layer, and a polymer electrolyte membrane disposed between the anode and the cathode, wherein at least one of the catalyst layer of the anode and the catalyst layer of the cathode, is the catalyst layer as defined in any one of [1] to [5].

Advantageous Effects of Invention

According to the present invention, it is possible to provide a catalyst layer, a catalyst layer forming liquid and a membrane electrode assembly, capable of forming a fuel cell excellent in power generation efficiency.

DESCRIPTION OF EMBODIMENTS

The meanings of terms in the present invention are as follows.

A "unit" in a polymer means an atomic group derived from one molecule of a monomer formed by polymerization of the monomer. A unit may be an atomic group directly formed by a polymerization reaction, or may be an atomic group obtained by processing a polymer obtained by the polymerization reaction and converting a part of the atomic group into another structure. The content (mol %) of each unit to all units contained in the polymer is obtained by analyzing the polymer by nuclear magnetic resonance spectroscopy.

A "precursor group of an ion exchange group" means a group that can be converted to an ion exchange group by a treatment such as hydrolysis treatment, treatment for conversion to an acid type, or other treatment for salt exchange to a metal cation.

The "average particle size of a carrier" means the arithmetic average value of the particle sizes (diameters) of optional 100 particles of the carrier as observed by TEM (transmission electron microscope). If the observed particle shape is not spherical, the diameter is measured by regarding it to be a sphere. The same applies to the average particle size of a catalyst.

The "TQ value" of a polymer is the volume flow rate value of the polymer, and is obtained by the method described in Examples. The TQ value becomes to be an index for the molecular weight.

Units represented by the formula (u11) will be referred to as units (u11). Units represented by other formulas will also be referred to in the same manner.

Further, a monomer represented by the formula (m11) will be referred to as a monomer (m11). Monomers represented by other formulas will also be referred to in the same manner.

Further, a group represented by the formula (g1) will be referred to as a group (g1). Groups represented by other formulas will also be referred to in the same manner.

At least one type of units containing a cyclic ether structure, selected from the group consisting of units (u11), units (u12), units (u21) and units (u22) may be referred to as "specific cyclic ether structural units".

Monomer (m11), monomer (m12), monomer (m21) and monomer (m22) may be collectively referred to as a "specific cyclic monomer".

[Catalyst Layer]

The catalyst layer of the present invention (hereinafter referred to also as "the present catalyst layer") comprises a supported catalyst having a carrier containing a metal oxide, and a catalyst supported on the carrier, and a polymer (hereinafter referred to also as a polymer (H)) having specific cyclic ether structural units and having ion exchange groups.

Further, the total of the content of the specific cyclic ether structural units is at least 30 mol % to all units which the polymer (H) contains.

By using this catalyst layer, it is possible to obtain a fuel cell excellent in power generation efficiency. The details of this reason have not been clarified, but it is presumed to be due to the following reason.

It is assumed that due to the interaction between the ether-bonding oxygen atom contained in the specific cyclic ether structural units of the polymer (H) and the oxygen atom of the metal oxide of the carrier, the polymer (H) is uniformly adhered to the surface of the metal oxide. It is considered that as a result, the function of the catalyst layer is well exhibited, and the power generation efficiency of the fuel cell is improved. In particular, the specific cyclic ether structural units have a three-dimensional steric structure and are therefore excellent in oxygen permeability.

<Supported Catalyst>

The present catalyst layer contains a supported catalyst having a carrier containing a metal oxide and a catalyst supported on the carrier.

The method for producing the supported catalyst is not particularly limited, and specific examples thereof may be a reverse micelle method, a colloidal method, and an impregnation method.

(Carrier)

Specific examples of the metal oxide contained in the carrier may be at least one type of oxides of metal elements selected from the group consisting of rare earth elements, alkaline earth metals, transition metals (preferably niobium, zirconium, molybdenum, tantalum, tungsten), bismuth, tin, antimony and indium, and it is preferred to contain an oxide of tin, from such a viewpoint that power generation efficiency of the fuel cell will thereby be more excellent.

The carrier may be doped with a dopant from such a viewpoint that the conductivity will thereby be improved. Specific examples of the dopant may be the metal elements contained in the above-mentioned metal oxides. For example, in a case where the main element (that is, the metal element having the highest content in the metal oxide) is tin, the dopant may be at least one type selected from the group consisting of vanadium, niobium, tantalum, chromium, molybdenum, tungsten, phosphorus, arsenic, antimony, bismuth, fluorine, chlorine, bromine and iodine, and from such a viewpoint that the conductivity will be further improved, at least one metal element selected from the group consisting of antimony, tungsten, niobium and tantalum is preferred, and at least one metal element selected from the group consisting of antimony, tungsten and niobium is particularly preferred.

The shape of the carrier is not particularly limited. The average particle size of the carrier is also not particularly limited so long as it can support the catalyst, but, from such a viewpoint that the power generation efficiency will be further excellent, is preferably from 5 to 500 nm, more preferably from 5 to 200 nm, further preferably from 5 to 100 nm, particularly preferably from 20 to 100 nm.

In the present catalyst layer, the ratio of the mass of the polymer (H) to the mass of the carrier (content of polymer (H)/content of carrier) is preferably from 0.05 to 0.3, particularly preferably from 0.05 to 0.1, from such a viewpoint that the power generation efficiency of the fuel cell will be further excellent.

(Catalyst)

The catalyst is supported on a carrier, and is preferably supported on the surface of the carrier.

Specific examples of the material constituting the catalyst may be noble metals, and platinum or a platinum alloy is preferred from such a viewpoint that the catalytic activity and stability will thereby be excellent.

The shape of the catalyst is not particularly limited, but is preferably a particle shape.

The average particle size of the catalyst is not particularly limited so long as its performance can be exhibited, but is preferably from 1 to 100 nm, particularly preferably from 1 to 20 nm.

The amount of the catalyst supported is preferably from 5 to 50 mass %, particularly preferably from 5 to 20 mass %, to the total mass of the supported catalyst, from such a viewpoint that the power generation efficiency of the fuel cell will be further excellent, and from the viewpoint of the cost.

<Polymer (H)>

The polymer (H) is a polymer having ion exchange groups, and it has at least one type of units containing a cyclic ether structure, selected from the group consisting of the following units (u11), units (u12), units (u21) and units (u22), as specific cyclic ether structural units.

(u11)

$R^{11}$ is a divalent perfluoroorganic group which may have an ether-bonding oxygen atom. An organic group is a group having at least one carbon atom. As the divalent perfluoroorganic group, a perfluoroalkylene group is preferred. When the perfluoroalkylene group has an ether-bonding oxygen atom, the number of oxygen atoms may be one, or two or more. Further, the oxygen atom may be located between the carbon-carbon bonds of the perfluoroalkylene group, or may be located at an end of the carbon atom bond. The perfluoroalkylene group may be linear or branched, but is preferably linear.

$R^{12}$, $R^{13}$, $R^{15}$ and $R^{16}$ are each independently a monovalent perfluoroorganic group which may have an ether-bonding oxygen atom, or a fluorine atom. As the monovalent perfluoroorganic group, a perfluoroalkyl group is preferred. From the viewpoint of high polymerization reactivity, at least one of $R^{15}$ and $R^{16}$ is preferably a fluorine atom, and more preferably, both are fluorine atoms.

$R^{14}$ is a monovalent perfluoroorganic group which may have an ether-bonding oxygen atom; a fluorine atom; or a group represented by —$R^{11}(SO_2X(SO_2R^f)_a)^-M^+$. As the monovalent perfluoroorganic group, a perfluoroalkyl group is preferred. In a case where the perfluoroalkyl group has an ether-bonding oxygen atom, the number of oxygen atoms may be one, or two or more. Further, the oxygen atom may be located between the carbon-carbon bonds of the perfluoroalkyl group, or may be located at an end of the carbon atom bond. The perfluoroalkyl group may be linear or branched, but is preferably linear. In a case where in the formula (u11), two $R^{11}$ are contained, the two $R^{11}$ may be the same or different.

$M^+$ is $H^+$, a monovalent metal cation (e.g. potassium ion, sodium ion), or an ammonium ion in which at least one hydrogen atom may be substituted by a hydrocarbon group (e.g. a methyl group, an ethyl group), and from the viewpoint of high conductivity, $H^+$ is preferred.

$R^f$ is a linear or branched perfluoroalkyl group which may have an ether-bonding oxygen atom. The number of carbon atoms of the perfluoroalkyl group is preferably from 1 to 8, particularly preferably from 1 to 6. In a case where in the formula (u11), two or more $R_f$ are contained, the two or more $R_f$ may be the same or different from one another.

X is an oxygen atom, a nitrogen atom or a carbon atom, and when X is an oxygen atom, a=0, when X is a nitrogen atom, a=1, and when X is a carbon atom, a=2.

A specific example of the $-(SO_2X(SO_2R^f)_a)^-M^+$ group may be a sulfonic acid group ($-SO_3^-M^+$ group), a sulfonimide group ($-SO_2N(SO_2R^f)^-M^+$ group), or a sulfonmethide group ($-SO_2C(SO_2R^f)_2)^-M^+$ group).

As the units (u11), the following units (u11-1) are preferred.

(u11-1)

(u12)

$R^{21}$ is a $C_{1-6}$ perfluoroalkylene group, or a $C_{2-6}$ perfluoroalkylene group having an ether-bonding oxygen atom between carbon-carbon bonds. In a case where the perfluoroalkylene group has an ether-bonding oxygen atom, the number of oxygen atoms may be one, or two or more. The perfluoroalkylene group may be linear or branched, but is preferably linear.

$R^{22}$ is a fluorine atom, a $C_{1-6}$ perfluoroalkyl group, a $C_{2-6}$ perfluoroalkyl group having an ether-bonding oxygen atom between carbon-carbon bonds, or a group represented by $-R^{21}(SO_2X(SO_2R^f)_a)^-M^+$. In a case where the perfluoroalkyl group has an ether-bonding oxygen atom, the number of oxygen atoms may be one, or two or more. The perfluoroalkyl group may be linear or branched, but is preferably linear. In the formula (u12), when two $R^{21}$ are contained, the two $R^{21}$ may be the same or different from each other.

$M^+$, $R^f$, X and a are, respectively, synonymous with $M^+$, $R_f$, X and a in the formula (u11).

Specific examples of the units (u12) may be the following units (u12-1) and units (u12-2). In the formulas, $M^+$ is synonymous with $M^+$ in the formula (u11).

(u12-1)

(u12-2)

(u21)

$R^{41}$, $R^{42}$, $R^{43}$, $R^{44}$, $R^{45}$ and $R^{46}$ are each independently a monovalent perfluoroorganic group which may have an ether-bonding oxygen atom, or a fluorine atom. As the monovalent perfluoroorganic group, a perfluoroalkyl group is preferred. In a case where the perfluoroalkyl group has an ether-bonding oxygen atom, the number of oxygen atoms may be one, or two or more. Further, the oxygen atom may be located between the carbon-carbon bonds of the perfluoroalkyl group, or may be located at an end of the carbon atom bond. The perfluoroalkyl group may be linear or branched, but is preferably linear.

From the viewpoint of high polymerization reactivity, it is preferred that at least one of $R^{45}$ and $R^{46}$ is a fluorine atom, and it is particularly preferred that both are fluorine atoms.

As the units (u21), the following units (u21-1) are preferred.

(u21-1)

(u22)

s is 0 or 1, preferably 0.

$R^{51}$ and $R^{52}$ are each independently a fluorine atom, a $C_{1-5}$ perfluoroalkyl group, or a spiro ring (provided in the case where s is 0) formed by linking to each other.

$R^{53}$ and $R^{54}$ are each independently a fluorine atom, or a $C_{1-5}$ perfluoroalkyl group.

$R^{55}$ is a fluorine atom, a $C_{1-5}$ perfluoroalkyl group, or a $C_{1-5}$ perfluoroalkoxy group. $R^{55}$ is preferably a fluorine atom from the viewpoint of high polymerization reactivity.

The perfluoroalkyl group and the perfluoroalkoxy group may be linear or branched, but are preferably linear.

As the units (u22), the following units (u22-1) are preferred.

(u22-1)

The total of the content of the specific cyclic ether structural units is, to all units which the polymer (H) contains, at least 30 mol %, and from such a viewpoint that the power generation efficiency of the fuel cell will be further excellent, preferably at least 40 mol %, more preferably at least 65 mol %.

The upper limit value of the total of the content of the specific cyclic ether structural units is, to all units which the polymer (H) contains, preferably 100 mol %, particularly preferably 80 mol %.

The polymer (H) may contain only one type of specific cyclic ether structural units, or may contain two or more types. In a case where only one type of specific cyclic ether structural units is contained, the above-mentioned total of the content means the content of only one type.

The polymer (H) may further contain units based on a perfluoromonomer (hereinafter simply referred to also as "perfluoromonomer units"). However, the above perfluoromonomer units do not contain a cyclic ether structure and contain units having an ion exchange group.

The units based on a perfluoromonomer may be the following units (u31) and units (u32), and from such a viewpoint that the power generation efficiency of the fuel cell will be further excellent, the units (u32) are preferred.

(u31)

Z is a fluorine atom, or a trifluoromethyl group, m is an integer of from 0 to 3, p is 0 or 1, n is 1 to 12, and m+p>0.

$M^+$ is synonymous with $M^+$ in the above formula (u11).

(u32)

$Q^1$ is a perfluoroalkylene group which may have an ether-bonding oxygen atom.

$Q^2$ is a single bond, or a perfluoroalkylene group which may have an ether-bonding oxygen atom.

In a case where the perfluoroalkylene group of $Q^1$ and $Q^2$ has an ether-bonding oxygen atom, the number of oxygen atoms may be one, or two or more. Further, the oxygen atom may be located between the carbon-carbon atoms of the perfluoroalkylene group, or may be located at an end of the carbon atom bond.

The perfluoroalkylene group may be linear or branched, but is preferably linear. The number of carbon atoms of the perfluoroalkylene group is preferably from 1 to 6, particularly preferably from 1 to 4. When the number of carbon atoms is at most 6, the boiling point of the fluorinated monomer as a raw material becomes low, and distillation purification becomes easy. Further, when the number of carbon atoms is at most 6, the decrease in the ion exchange capacity of the polymer (H) is suppressed, and the proton conductivity becomes good.

$Q^2$ is preferably a $C_{1-6}$ perfluoroalkylene group which may have an ether-bonding oxygen atom. When $Q^2$ is a $C_{1-6}$ perfluoroalkylene group which may have an ether-bonding oxygen atom, stability of the power generation performance will be excellent when the fuel cell is operated for a long period of time, as compared with the case where $Q^2$ is a single bond.

It is preferred that at least one of $Q^1$ and $Q^2$ is a $C_{1-6}$ perfluoroalkylene group having an etheric oxygen atom. A fluorinated monomer having a $C_{1-6}$ perfluoroalkylene group having an etheric oxygen atom can be synthesized without undergoing a fluorination reaction with fluorine gas, whereby the yield is good and the production is easy.

Y is a fluorine atom, or a monovalent perfluoroorganic group. Y is preferably a fluorine atom, or a $C_{1-6}$ linear perfluoroalkyl group which may have an etheric oxygen atom.

q is 0 or 1.

$R^f$, X and a are, respectively, synonymous with $R^f$, X and a in the above formula (u11).

The units (u32) are preferably units (u32-1) to (u32-3), more preferably units (u32-1), since the production is easy, and the industrial implementation is easy.

(u32-1)

(u32-2)

(u32-3)

The total of the content of the perfluoromonomer units is preferably from 5 to 40 mol %, more preferably from 10 to 35 mol %, particularly preferably from 15 to 30 mol %, to all units in which the polymer (H) contains.

The polymer (H) may contain only one type of perfluoromonomer units, or may contain two or more types. In a case where only one type of perfluoromonomer units is contained, the above total of the content means the content of only one type.

The polymer (H) may further contain units based on tetrafluoroethylene (hereinafter simply referred to also as "tetrafluoroethylene units"). Water repellency is thereby imparted, whereby the water discharge capacity in the catalyst layer is increased, and the power generation efficiency of the fuel cell is improved.

The content of the tetrafluoroethylene units is preferably from 5 to 40 mol %, more preferably from 5 to 35 mol %, particularly preferably from 5 to 30 mol %, to all units which the polymer (H) contains.

The polymer (H) may contain units other than the above. Specific examples of units other than the above may be units based on monomers, such as perfluoro(3-butenyl vinyl ether), perfluoro(allyl vinyl ether), a perfluoro α-olefin (hexafluoropropylene, etc.), and a perfluoro(alkyl vinyl ether).

The ion exchange groups which the polymer (H) has, are preferably the following groups (g1).

(g1)

$M^+$, $R^f$, X and a are, respectively, synonymous with $M^+$, $R^f$, X and a in the above formula (u11).

As a specific example of the group (g1), a sulfonic acid group ($—SO_3^-M^+$ group), a sulfonimide group ($—SO_2N(SO_2R^f)^-M^+$ group), or a sulfonmethide group ($—SO_2C(SO_2R^f)_2^-M^+$ group) may be mentioned, and a sulfonic acid group ($—SO_3^-M^+$ group) is preferred.

The polymer (H) is a polymer having ion exchange groups, but in a case where the specific cyclic ether structural units in the polymer (H) have an ion exchange group, it is not necessarily required to have another type of units having an ion exchange group. If the specific cyclic ether structural units in the polymer (H) do not have an ion exchange group, it must have units having an ion exchange group, such as perfluoromonomer units.

A preferred embodiment of the polymer (H) is an embodiment in which the units containing the above cyclic ether structure include the units (u22), from such a viewpoint that the power generation efficiency of the fuel cell will be further excellent.

Further, a more preferred embodiment of the polymer (H) is, since the power generation efficiency of the fuel cell is particularly excellent, an embodiment in which the units containing the cyclic ether structure include the units (u22), and at least one of the units (u11) and the units (u12).

Further, another more preferred embodiment of the polymer (H) is, from such a viewpoint that the power generation efficiency of the fuel cell is particularly excellent, an embodiment containing units (u22), perfluoromonomer units, and tetrafluoroethylene units.

<Physical Properties>

The ion exchange capacity of the polymer (H) is preferably from 1.1 to 2.8 meq/g dry resin, more preferably from 1.2 to 2.8 meq/g dry resin, particularly preferably from 1.3 to 2.3 meq/g dry resin. When the ion exchange capacity is at least the above lower limit value, the conductivity of the polymer (H) becomes high, whereby a sufficient battery output can be obtained when used as the polymer for the catalyst layer of the fuel cell. When the ion exchange capacity is at most the above upper limit value, the synthesis of the polymer will be easy.

The TQ value of the polymer (H) is, from the viewpoint of preventing cracking of the electrode, preferably at least 200° C., more preferably at least 210° C., and from the viewpoint of preventing thermal decomposition of the fluororesin, preferably at most 330° C., more preferably at most 310° C., particularly preferably at most 300° C. Further, when the TQ value is at least the above lower limit value and at most the upper limit value, the polymer (H) will be excellent also in hot water resistance.

<Application>

The present catalyst layer will be suitably used as a catalyst layer in a membrane electrode assembly as described later.

<Method for Producing Polymer (H)>

The polymer (H) is produced by polymerizing a specific cyclic monomer and at least one of a perfluoromonomer and tetrafluoroethylene to be used as the case requires, to obtain a polymer (F) having precursor groups for ion exchange groups, and converting the precursor groups to ion exchange groups.

Hereinafter, the respective monomers (monomer (m11), monomer (m12), monomer (m21), and monomer (m22)) which may be used for producing the polymer (H) will be described.

(Monomer (m11))

$R^{11}$ to $R^{16}$ are, respectively, synonymous with $R^{11}$ to $R^{16}$ in the formula (u11).

Specific examples of the monomer (m11) may be the following monomers (m11-1) to (m11-4), and, from the viewpoint of easy synthesis and high polymerization reactivity, the monomer (m11-1) is preferred.

The monomer (m11) can be synthesized, for example, by the methods described in WO 2003/037885 Pamphlet, JP-A-2005-314388, JP-A-2009-040909, etc.

(Monomer (m12))

$R^{21}$ and $R^{22}$ are, respectively, synonymous with $R^{21}$ and $R^{22}$ in the formula (u12).

Specific examples of the monomer (m12) may be the following monomer (m12-1) and monomer (m12-2).

The monomer (m12) can be synthesized, for example, by the method described in JP-A-2006-152249.

(Monomer (m21))

(m21)

$R^{41}$ to $R^{46}$ are, respectively synonymous with $R^{41}$ to $R^{46}$ in the formula (u21).

Specific examples of the monomer (m21) may be the following monomer (m21-1) and monomer (m21-2), and from such a viewpoint that the synthesis is easy, and the polymerization reactivity is high, the monomer (m21-1) is particularly preferred.

(m2-1)

(m21-2)

The monomer (m21) can be synthesized, for example, by the method described in WO 2000/056694 Pamphlet; Izvestiya Akademii Nauk SSSR, Seriya Khimicheskaya, 1989, Vol. 4, p. 938-42.

(Monomer (m22))

(m22)

$R^{51}$ to $R^{55}$ and s are, respectively, synonymous with $R^{51}$ to $R^{55}$ and s in the formula (u22).

Specific examples of the monomer (m22) may be the following monomers (m22-1) to (m22-11), and from such a viewpoint that the effect to improve the electrode performance of the polymer (H) is high, the monomer (m22-1) is particularly preferred.

(m22-1)

(m22-2)

(m22-3)

(m22-4)

(m22-5)

(m22-6)

(m22-7)

(m22-8)

(m22-9)

(m22-10)

(m22-11)

The monomer (m22) can be synthesized, for example, by the method described in in Macromolecules, Vol. 26, No. 22, 1993, p. 5829-5834; JP-A-H6-92957, etc.

For the production of the polymer (H), a perfluoromonomer that does not contain a cyclic ether structure and contains a precursor group for an ion exchange group may be used.

As the perfluoromonomer, the following monomer (m31) and monomer (m32) may be mentioned, and from such a viewpoint that the power generation efficiency of the fuel cell will be further excellent, the monomer (m32) is preferred.

(Monomer (m31))

$CF_2=CF(OCF_2CFZ)_mO_p(CF_2)_nSO_2F$ (m31)

Z, m, p and n are, respectively, synonymous with Z, m, p and n in the formula (u31).

As the monomer (m31), monomers (m31-1) to (m31-3) are preferred.

$CF_2=CFO(CF_2)_{n1}SO_2F$ (m31-1)

$CF_2=CFOCF_2CF(CF_3)O(CF_2)_{n2}SO_2F$ (m31-2)

$CF_2=CF(OCF_2CF(CF_3))_{m3}O(CF_2)_{n3}SO_2F$ (m31-3)

Here, n1, n2, and n3 are integers of from 1 to 8, and m3 is an integer of from 1 to 3.

The monomer (m31) can be synthesized, for example, by the methods described in Prog. Polym. Sci., Vol. 12, 1986, p. 233-237; U.S. Pat. No. 4,330,654, etc.

(Monomer (m32))

$Q^1$, $Q^2$, Y and q are, respectively, synonymous with $Q^1$, $Q^2$, Y and q in the formula (u32).

As the monomer (m32), from such a viewpoint that the production of the polymer (H) is easy, and the industrially implementation is easy, the following monomers (m32-1) to (m32-3) are preferred, and the monomer (m32-1) is particularly preferred.

The monomer (m32) can be synthesized, for example, by the methods described in WO 2007/0135333 Pamphlet, JP-A-2008-20039, etc.

For the production of the polymer (H), tetrafluoroethylene may be used.

For the production of the polymer (H), monomers other than the above may be used. Specific examples of such monomers may be perfluoro(3-butenyl vinyl ether), perfluoro(allyl vinyl ether), a perfluoro α-olefin (hexafluoropropylene, etc.), a perfluoro(alkyl vinyl ether), etc.

An example of a method for converting a precursor group ($-SO_2F$) for an ion exchange group to an ion exchange group will be shown below.

The method for converting a group represented by $-SO_2F$ to a sulfonic acid group ($-SO_3^-H^+$) may be the following method (i), and the method for converting a group represented by $-SO_2F$ to a sulfonimide group ($-SO_2N(SO_2R^f)^-H^+$) may be the following methods (ii).

(i) A method of hydrolyzing a group represented by $-SO_2F$ to a sulfonic acid salt, and converting the sulfonic acid salt to an acid type to form a sulfonic acid group.

(ii) A method of imidizing a group represented by $-SO_2F$ to form a salt type sulfonimide group, and further converting it to an acid type to form an acid type sulfonimide group.

Method (i):

Hydrolysis is carried out, for example, by contacting a polymer having a precursor for an ion exchange group with a basic compound in a solvent. The basic compound may be sodium hydroxide, potassium hydroxide, etc. The solvent may be water, a mixed solvent of water and a polar solvent, etc. The polar solvent may be an alcohol (methanol, ethanol, etc.), dimethyl sulfoxide, etc.

Conversion to an acid type in method (i) is carried out, for example, by bringing the polymer having a sulfonic acid salt into contact with an aqueous solution of hydrochloric acid, sulfuric acid, etc.

Hydrolysis and conversion to an acid type are usually carried out at from 0 to 120° C.

Method (ii):

As the imidization, the following methods may be mentioned.

(ii-1) A method of reacting a group represented by $-SO_2F$ with $R^fSO_2NHM$.

(ii-2) A method of reacting a group represented by $-SO_2F$ with $R^fSO_2NH_2$ in the presence of an alkali metal hydroxide, an alkali metal carbonate, MF, ammonia or primary to tertiary amine.

(ii-3) A method of reacting a group represented by $-SO_2F$ with $R^fSO_2NMSi(CH_3)_3$.

Here, M is an alkali metal or primary to quaternary ammonium.

Conversion to an acid type in the method (ii) is carried out by treating a polymer having a salt-type sulfonimide group with an acid (sulfuric acid, nitric acid, hydrochloric acid, etc.).

Further, the polymer (H) in which ion exchange groups are sulfonimide groups, may also be produced by polymerizing a monomer having a group represented by $-SO_2F$ in monomer (m11), (m12), (m31) or (m32) converted to a sulfonimide group, with monomer (m21) or monomer (m22).

The monomer having a group represented by $-SO_2F$ converted to a sulfonimide group, may be produced by adding chlorine or bromine to a carbon-carbon double bond of monomer (m11), (m12), (m31) or (m32), converting a group represented by $-SO_2F$ to a sulfonimide group by the method (ii), and then carrying out a dechlorination or debromination reaction by using metallic zinc.

[Catalyst Layer Forming Liquid]

The catalyst layer forming liquid of the present invention (hereinafter referred to also as "the present catalyst layer forming liquid") comprises a supported catalyst having a carrier containing a metal oxide and a catalyst supported on the carrier, a polymer (polymer (H)) having specific cyclic ether structural units and ion exchange groups, and a solvent.

Further, the content of the cyclic ether structural units is at least 30 mol % to all units which the polymer (H) contains.

Since the supported catalyst and polymer (H) contained in the present catalyst layer forming liquid are the same as the supported catalyst and polymer (H) in the above-described present catalyst layer, the description thereof will be omitted.

According to the present catalyst layer forming liquid, the above-mentioned present catalyst layer can be formed.

As the solvent, water and an organic solvent may be mentioned, and a mixed solvent thereof may be used.

Specific examples of the organic solvent may be methanol, ethanol, 1-propanol, 2-propanol, 1-butanol, 2-methyl-1-propanol, 2-butanol, 2-methyl-2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6-nonafluoro-1-hexanol and 3,3,4,4,5,5,6,6,7,7,8,8,8-tridecafluoro-1-octanol. As the organic solvent, one type may be used alone, or two or more types may be used in combination.

The mass of the solid content in the catalyst layer forming liquid is preferably from 15 to 45 mass %, more preferably from 20 to 35 mass %, particularly preferably from 20 to 30 mass %, to the total mass of the present catalyst layer forming liquid.

The mass of the solid content in the catalyst layer forming liquid means the mass obtained by removing the solvent from the catalyst layer forming liquid.

[Membrane Electrode Assembly]

The membrane electrode assembly of the present invention has an anode having a catalyst layer, a cathode having a catalyst layer, and a polymer electrolyte membrane disposed between the anode and the cathode, wherein at least one of the catalyst layer of the anode and the catalyst layer of the cathode is the above-described present catalyst layer.

The membrane electrode assembly is preferably used for a polymer electrolyte fuel cell.

According to the membrane electrode assembly of the present invention, since it has the above-described catalyst layer, it is possible to form a fuel cell excellent in power generation efficiency.

Figure 1:
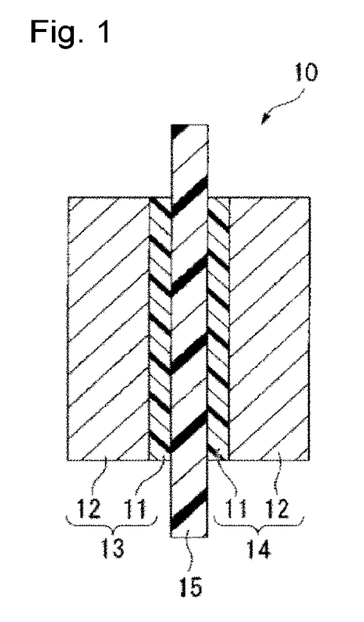
FIG. 1 is a schematic cross-sectional view showing an example of the membrane electrode assembly of the present invention.

FIG. 1 is a schematic cross-sectional view showing an example of the membrane electrode assembly of the present invention. The membrane electrode assembly 10 has an anode 13 having a catalyst layer 11 and a gas diffusion layer 12, a cathode 14 having a catalyst layer 11 and a gas diffusion layer 12, and a polymer electrolyte membrane 15 which is disposed between the anode 13 and the cathode 14 in a state in contact with the catalyst layers 11.

At least one of the catalyst layer 11 which the anode 13 has and the catalyst layer 11 which the cathode 14 has, may be the above-described present catalyst layer, and both may be the above-described catalyst layers. In a case where one catalyst layer 11 is the above-described present catalyst layer and the other catalyst layer 12 is a catalyst layer other than the above-described present catalyst layer, as the catalyst layer other than the present catalyst layer, a known catalyst layer may be employed.

As the method for forming the catalyst layer 11, the following methods may be mentioned.

(i) A method in which a catalyst layer forming liquid is applied on a solid polymer electrolyte membrane 15, a gas diffusion layer 12, or a carbon layer as described later, followed by drying.

(ii) A method in which a catalyst layer forming liquid is applied on a base film and dried to form a catalyst layer 11, and the catalyst layer 11 is transferred onto a polymer electrolyte membrane 15.

The gas diffusion layer 12 has a function to uniformly diffuse the gas into the catalyst layer 11 and a function as a current collector.

The gas diffusion layer 12 may be carbon paper, carbon cloth, carbon felt, etc. The gas diffusion layer 12 is preferably treated for water-repellency with polytetrafluoroethylene, etc.

The membrane electrode assembly 10 in FIG. 1 contains the gas diffusion layer 12, but the gas diffusion layer is an arbitrary member and may not be contained in the membrane electrode assembly.

The polymer electrolyte membrane 15 is a membrane containing a polymer having ion exchange groups.

As the polymer having ion exchange groups, the above-mentioned polymer (H) and a known polymer having ion exchange groups may be mentioned. Specific examples of the known polymer may be a polymer having groups represented by $-SO_2F$ in a polymer having units based on monomer (m31) and tetrafluoroethylene units, converted to sulfonic acid groups, a polymer having groups represented by $-SO_2F$ in a polymer having units based on monomer (m32) and tetrafluoroethylene units, converted to sulfonic acid groups, etc.

The polymer electrolyte membrane 15 can be formed, for example, by a method (cast method) in which a liquid composition of a polymer is applied on a base film or a catalyst layer 11, followed by drying.

The liquid composition is a dispersion in which a polymer is dispersed in a solvent containing at least one of an organic solvent and water.

It is preferred to carry out heat treatment in order to stabilize the polymer electrolyte membrane 15. The temperature of the heat treatment is preferably from 130 to 200° C., although it depends on the type of the polymer.

The polymer electrolyte membrane 15 may be treated with hydrogen peroxide solution, as the case requires.

The polymer electrolyte membrane 15 may be reinforced with a reinforcing material. The reinforcing material may be porous materials, fibers, woven fabrics, non-woven fabrics, etc. The material for the reinforcing material may be polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide, etc.

The polymer electrolyte membrane 15 may further contain at least one type of atoms selected from the group consisting of cerium and manganese in order to further improve the durability. Cerium and manganese will decompose hydrogen peroxide, which is a causative substance that brings about deterioration of the polymer electrolyte membrane 15. Cerium and manganese are preferably present as ions in the polymer electrolyte membrane 15, and may be present in any state in the polymer electrolyte membrane 15 so long as they are present as ions.

The polymer electrolyte membrane 15 may contain silica and a heteropolyacid (zirconium phosphate, phosphomolybdic acid, phosphotungstic acid, etc.) as a water retention agent for preventing drying.

The membrane electrode assembly 10 may be produced, for example, by the following methods.

(i) A method in which catalyst layers 11 are formed on a polymer electrolyte membrane 15 to form a membrane catalyst layer assembly, and the membrane catalyst layer assembly is sandwiched between gas diffusion layers 12.

(ii) A method in which a catalyst layer 11 is formed on a gas diffusion layer 12 to serve as electrodes (anode 13 and cathode 14), and a polymer electrolyte membrane 15 is sandwiched between the electrodes.

The membrane electrode assembly 10 may have a carbon layer (not shown) between the catalyst layer 11 and the gas diffusion layer 12. When the carbon layer is disposed, the gas diffusibility on the surface of the catalyst layer 11 is improved, whereby the power generation performance of the fuel cell can be further improved.

The carbon layer contains, for example, carbon and a nonionic fluorinated polymer. As a specific example of carbon, carbon nanofibers having a fiber diameter of from 1 to 1,000 nm and a fiber length of at most 1,000 μm are preferred. A specific example of the nonionic fluorinated polymer may be polytetrafluoroethylene.

EXAMPLES

Hereinafter, the present invention will be specifically described with reference to Examples, but the present invention is not limited to these Examples. Here, Ex. 1 to 11 are Preparation Examples, Ex. 12 to 20 are Examples of the present invention, and Ex. 21 and 22 are Comparative Examples.

[Ion Exchange Capacity]

The ion exchange capacity of polymer (H) (polymer after hydrolysis treatment) was obtained by the following method.

The polymer (H) was put in a glove box and left in an atmosphere having dry nitrogen permitted to flow, for at least 24 hours and dried. The dried mass of the polymer (H) was measured in the glove box.

The polymer (H) was immersed in a 2 mol/L sodium chloride aqueous solution, left at 60° C. for 1 hour, and then cooled to room temperature. The ion exchange capacity of the polymer (H) was obtained by titrating the aqueous sodium chloride solution in which the polymer (H) was immersed, with a 0.5 mol/L sodium hydroxide aqueous solution.

[TQ Value]

Using a flow tester (CFT-500D manufactured by Shimadzu Corporation) equipped with a nozzle having a length of 1 mm and an inner diameter of 1 mm, the polymer (H) was melt-extruded while changing the temperature under the conditions of an extrusion pressure of 2.94 MPa (gauge pressure). The extruded amount of the polymer (H) was measured by changing the temperature, and the temperature at which the extruded amount became 100 mm$^3$/sec was obtained as the TQ value of the polymer (H).

[Synthesis of Monomer (m11-1)]

Monomer (m11-1) was synthesized in accordance with the method as described in Examples at p. 37-42 in Pamphlet of WO 2003/037885.

(m11-1)

[Synthesis of Monomer (m12-1)]

Monomer (m12-1) was synthesized in accordance with the method as described in Example 1 of JP-A-2006-152249.

(m12-1)

[Synthesis of Monomer (m31-4)]

Monomer (m31-4) was synthesized by a known method.

(m31-4)

[Synthesis of Monomer (m31-5)]

Monomer (m31-5) was synthesized by a known method.

(m31-5)

[Synthesis of Monomer (m32-1)]

Compound (m32-1) was synthesized in accordance with the method as described in Example 1 of JP-A-2008-202039.

(m32-1)

[Synthesis of Monomer (m21-1)]

Monomer (m21-1) was synthesized in accordance with a known method.

(m21-1)

[Synthesis of Monomer (m22-1)]

Monomer (m22-1) was synthesized in accordance with a known method.

(m22-1)

[Synthesis of monomer (m24-1)]

Monomer (m24-1) was synthesized in accordance with a known method.

(m24-1)

[Radical Polymerization Initiator]

The following compounds (i-1) to (i-3) were prepared as radical polymerization initiators.

<Compound (i-1)>

(i-1)

<Compound (i-2)>

$((CH_3)_2CHOCOO)_2$ (i-2)

<Compound (i-3)>

$(C_3F_7COO)_2$ (i-3)

[Solvent]

The following compounds (s-1) and (s-2) were prepared as solvents.

<Compound (s-1)>

$CClF_2CF_2CHClF$ (s-1)

<Compound (s-2)>

$CH_3CCl_2F$ (s-2)

[Production of Supported Catalyst]

2.7 g of chloroplatinic acid hexahydrate was dissolved in 300 ml of ultrapure water, and 15.3 g of sodium sulfite was further added and stirred. The solution was diluted with 1,100 ml of water, and the pH of the solution was adjusted to 5 with NaOH. Then hydrogen peroxide was added, and the pH was readjusted to 5 with NaOH.

To the obtained solution, 300 mL of ultrapure water in which 4 g of $SnO_2$ powder having an average particle diameter of 30 nm was dispersed, was mixed, and the mixture was stirred at 90° C. for 3 hours. After cooling to room temperature, the mixture was filtered, washed with ultrapure water and alcohol, and dried at 80° C. to obtain a Pt-supported $SnO_2$ catalyst powder as a supported catalyst. The supported amount of Pt was confirmed to be 20 mass % by using high frequency induction heating emission spectroscopy (ICP).

Ex. 1: Preparation Example

Into a stainless steel autoclave having an internal volume of 125 mL, 9.15 g of compound (m22-1), 45.65 g of compound (m32-1) and 6.4 mg of compound (i-2) were charged and sufficiently degassed under cooling with liquid nitrogen. Then, the temperature was raised to 40° C. and held for 24.5 hours, and then, the autoclave was cooled to stop the reaction.

The product was diluted with compound (s-1), then n-hexane was added thereto, and the polymer was aggregated and filtered. Then, in compound (s-1), the polymer was stirred and reaggregated by n-hexane and dried under reduced pressure at 80° C. overnight to obtain polymer (F-1). The yield was 4.5 g. The density of the polymer (F-1) was measured. The results are shown in Table 1.

The polymer (F-1) was immersed for 40 hours in an aqueous solution of 50° C. containing 20 mass % of methanol and 15 mass % of potassium hydroxide, whereby —$SO_2F$ groups in the polymer (F-1) were hydrolyzed and converted to —$SO_3K$ groups. Then, the polymer was immersed in a 3 mol/L hydrochloric acid aqueous solution at room temperature for 2 hours. Replacing the hydrochloric acid aqueous solution, the same treatment was further repeated four times, to obtain polymer (H-1) having —$SO_3K$ groups in the polymer converted to sulfonic acid groups. The polymer (H-1) was thoroughly washed with ultrapure water. The ion exchange capacity of the polymer (H-1) was measured. The results are shown in Table 1.

To the polymer (H-1), a mixed solvent of ethanol and water (ethanol/water=60/40 mass ratio) was added to adjust the solid content concentration to be 15 mass %, followed by stirring at 105° C. for 8 hours by using an autoclave, to obtain a liquid composition (D-1) having the polymer (H-1) dispersed in a dispersion medium.

Ex. 2: Preparation Example

Into a stainless steel autoclave having an internal volume of 230 mL, 32.4 g of compound (m22-1), 166.70 g of compound (m32-1) and 101 mg of compound (i-2) were charged and sufficiently degassed under cooling with liquid nitrogen. Then, 3.87 g of tetrafluoroethylene (TFE) was charged, the temperature was raised to 24° C., followed by stirring for 24 hours, and then the autoclave was cooled to stop the reaction.

The product was diluted with compound (s-1), n-hexane was added thereto, and the polymer was aggregated and filtered. Then, in compound (s-1), the polymer was stirred and reaggregated by n-hexane and dried under reduced pressure at 80° C. overnight to obtain polymer (F-2). The yield was 45.9 g. The density of the polymer (F-2) was measured. The results are shown in Table 1.

Using the polymer (F-2), the polymer (H-2) was obtained in the same manner as in Ex. 1. The ion exchange capacity of the polymer (H-2) was measured. The results are shown in Table 1.

Using the polymer (H-2), a liquid composition (D-2) was obtained in the same manner as in Ex. 1.

Ex. 3: Preparation Example

Into a stainless steel autoclave having an internal volume of 230 mL, 37.45 g of compound (m22-1), 120.20 g of compound (m32-1) and 25.2 mg of compound (i-2) were charged and sufficiently degassed under cooling with liquid nitrogen. Then, 4.39 g of TFE was charged, the temperature was raised to 24° C., followed by stirring for 12 hours and 30 minutes, and then the autoclave was cooled to stop the reaction.

The product was diluted with compound (s-1), then n-hexane was added thereto, and the polymer was aggregated and filtered. Then, in compound (s-1), the polymer was stirred and reaggregated by n-hexane and dried under reduced pressure at 80° C. overnight to obtain polymer (F-3). The yield was 29.6 g.

Using the polymer (F-3), the polymer (H-3) was obtained in the same manner as in Ex. 1. The ion exchange capacity of the polymer (H-3) was measured. The results are shown in Table 1.

Using the polymer (H-3), a liquid composition (D-3) was obtained in the same manner as in Ex. 1.

Ex. 4: Preparation Example

Into a stainless steel autoclave having an internal volume of 125 mL, 8.50 g of compound (m22-1), 59.5 g of compound (m31-4) and 20.4 mg of compound (i-2) were charged and sufficiently degassed under cooling with liquid nitrogen. Then, 2.5 g of TFE was charged, the temperature was raised to 24° C., followed by stirring for 24 hours, and then the autoclave was cooled to stop the reaction.

The product was diluted with compound (s-1), n-hexane was added thereto, and the polymer was aggregated and filtered. Then, in compound (s-1), the polymer was stirred and reaggregated by n-hexane and dried under reduced pressure at 80° C. overnight to obtain polymer (F-4). The yield was 11.1 g.

Using the polymer (F-4), the polymer (H-4) was obtained in the same manner as in Ex. 1. The ion exchange capacity of the polymer (H-4) was measured. The results are shown in Table 1.

Using the polymer (H-4), a liquid composition (D-4) was obtained in the same manner as in Ex. 1.

Ex. 5: Preparation Example

Into a stainless steel autoclave having an internal volume of 125 mL, 9.80 g of compound (m22-1), 37.4 g of compound (m31-5) and 14.1 mg of compound (i-2) were charged and sufficiently degassed under cooling with liquid nitrogen. Then, 2.5 g of TFE was charged, the temperature was raised to 24° C., followed by stirring for 24 hours, and then the autoclave was cooled to stop the reaction.

The product was diluted with compound (s-1), then n-hexane was added thereto, and the polymer was aggregated and filtered. Then, in compound (s-1), the polymer was stirred and reaggregated by n-hexane and dried under reduced pressure at 80° C. overnight to obtain polymer (F-5). The yield was 10.5 g.

Using the polymer (F-5), the polymer (H-5) was obtained in the same manner as in Ex. 1. The ion exchange capacity of the polymer (H-5) was measured. The results are shown in Table 1.

Using the polymer (H-5), a liquid composition (D-5) was obtained in the same manner as in Ex. 1.

Ex. 6: Preparation Example

Into a stainless steel autoclave having an internal volume of 125 mL, 3.5 g of compound (m21-1), 76.33 g of compound (m32-1) and 8.5 mg of compound (i-2) were charged and sufficiently degassed under cooling with liquid nitrogen. Then, the temperature was raised to 40° C., followed by stirring for 24 hours, and then the autoclave was cooled to stop the reaction.

The product was diluted with compound (s-1), n-hexane was added thereto, and the polymer was aggregated and filtered. Then, in compound (s-1), the polymer was stirred and reaggregated by n-hexane and dried under reduced pressure at 80° C. overnight to obtain polymer (F-6). The yield was 6.4 g. The density of the polymer (F-6) was measured. The results are shown in Table 1.

Using the polymer (F-6), polymer (H-6) and liquid composition (D-6) were obtained in the same manner as in Ex. 1. The ion exchange capacity of the polymer (H-6) was measured. The results are shown in Table 1.

Ex 7: Preparation Example

Into a stainless steel autoclave having an internal volume of 125 mL, 5.97 g of compound (m11-1), 13.70 g of compound (m22-1), 13.75 g of compound (s-1) and 17.1 mg of compound (i-1) were charged and sufficiently degassed under cooling with liquid nitrogen. Then, the temperature was raised to 65° C. and held for 6 hours, and then the autoclave was cooled to stop the reaction.

The product was diluted with compound (s-1), then n-hexane was added thereto, and the polymer was aggregated and filtered. Then, in compound (s-1), the polymer was stirred and reaggregated by n-hexane and dried under reduced pressure at 80° C. overnight to obtain polymer (F-7). The yield was 3.7 g.

Using the polymer (F-7), the polymer (H-7) was obtained in the same manner as in Ex. 1. The ion exchange capacity of the polymer (H-7) was measured. The results are shown in Table 1.

To the polymer (H-7), a mixed solvent of ethanol and water (ethanol/water=60/40 mass ratio) was added to adjust the solid content concentration to 15 mass %, followed by stirring at 105° C. for 8 hours by using an autoclave, to obtain a liquid composition (D-7) having the polymer (H-7) dispersed in a dispersion medium.

Ex. 8: Preparation Example

Into a stainless steel autoclave having an internal volume of 125 mL, 15.0 g of compound (m22-1), 15.29 g of compound (m12-1), 10.0 g of compound (s-1) and 23 mg of compound (i-1) were charged and sufficiently degassed under cooling with liquid nitrogen. Then, the temperature was raised to 65° C., followed by stirring for 18 hours, and then the autoclave was cooled to stop the reaction.

The product was diluted with compound (s-1), n-hexane was added thereto, and the polymer was aggregated and filtered. Then, in compound (s-1), the polymer was stirred and reaggregated by n-hexane and dried under reduced pressure at 80° C. overnight to obtain polymer (F-8). The yield was 12.0 g.

Using the polymer (F-8), the polymer (H-8) was obtained in the same manner as in Ex. 1. The ion exchange capacity of the polymer (H-8) was measured. The results are shown in Table 1.

Using the polymer (H-8), a liquid composition (D-8) was obtained in the same manner as in Ex. 1.

Ex. 9: Preparation Example

Into a stainless steel autoclave having an internal volume of 230 mL, 21.2 g of compound (m11-1), 170 g of compound (s-1) and 9.5 mg of compound (i-2) were charged and sufficiently degassed under cooling with liquid nitrogen. Then, 20 g of TFE was charged, the temperature was raised to 40° C., followed by stirring for 7 hours, and then the autoclave was cooled to stop the reaction.

The product was diluted with compound (s-1), n-hexane was added thereto, and the polymer was aggregated and filtered. Then, in compound (s-1), the polymer was stirred and reaggregated by n-hexane and dried under reduced pressure at 80° C. overnight to obtain polymer (F-9). The yield was 11.5 g.

Using the polymer (F-9), the polymer (H-9) and the liquid composition (D-9) were obtained in the same manner as in Ex. 1. Further, the ion exchange capacity of the polymer (H-9) was measured. The results are shown in Table 1.

Ex. 10: Preparation Example

Into a stainless steel autoclave having an internal volume of 125 mL, 49.64 g of compound (m31-4), 28.22 g of compound (s-1) and 38.9 mg of the compound (i-3) dissolved at a concentration of 3.2 mass % in compound (s-1), were charged, and sufficiently degassed under cooling with liquid nitrogen. Then, the temperature was raised to 30° C., TFE was introduced into the system, and the pressure was maintained at 0.37 MPaG. After stirring for 4.8 hours, the autoclave was cooled to stop the reaction.

After diluting the product with compound (s-1), compound (s-2) was added thereto, and the polymer was aggregated and filtered. Then, in compound (s-1), the polymer was stirred and reaggregated by compound (s-2), and dried under reduced pressure at 80° C. overnight to obtain polymer (F-10). The yield was 15.0 g.

Using the polymer (F-10), the polymer (H-10) and the liquid composition (D-10) were obtained in the same manner as in Ex. 1. Further, the ion exchange capacity of the polymer (H-10) was measured. The results are shown in Table 1.

Ex. 11: Preparation Example

Into a stainless steel autoclave having an internal volume of 125 mL, 41.7 g of compound (m24-1), 31.3 g of (m32-1) and 25.0 mg of compound (i-3) dissolved at a concentration of 3.2 mass % in compound (s-1) were charged, and sufficiently degassed under cooling with liquid nitrogen. Then, the temperature was raised to 20° C., followed by stirring for 20 hours, and then the autoclave was cooled to stop the reaction.

The product was diluted with compound (s-1), n-hexane was added thereto, and the polymer was aggregated and filtered. Then, in compound (s-1), the polymer was stirred and reaggregated by n-hexane, and dried under reduced pressure at 80° C. overnight to obtain polymer (F-11). The yield was 5.9 g. The density of the polymer (F-11) was measured. The results are shown in Table 1.

Using the polymer (F-11), the polymer (H-11) and the liquid composition (D-11) were obtained in the same manner as in Ex. 1. The ion exchange capacity of the polymer (H-11) was measured. The results are shown in Table 1.

In Table 1, "the total of contents of specific cyclic ether structural units" means the total (mol %) of contents of the above-mentioned units (u11), units (u12), units (u21) and units (u22), to all units which the polymer contains after the hydrolysis treatment.

TABLE 1

| | Type of monomer | | | Total of contents of specific cyclic ether structural units (mol %) | Polymer Before hydrolysis treatment | After hydrolysis treatment Type | TQ Value (° C.) | Liquid composition | Ion exchange capacity of polymer after hydrolysis treatment meq/g dry resin |
|---|---|---|---|---|---|---|---|---|---|
| Ex. 1 | m22-1 | m32-1 | — | 78 | F-1 | H-1 | 250 | D-1 | 1.34 |
| Ex. 2 | m22-1 | m32-1 | TFE | 67 | F-2 | H-2 | 245 | D-2 | 1.49 |
| Ex. 3 | m22-1 | m32-1 | TFE | 75 | F-3 | H-3 | 280 | D-3 | 1.10 |
| Ex. 4 | m22-1 | m31-4 | TFE | 43 | F-4 | H-4 | 220 | D-4 | 1.15 |
| Ex. 5 | m22-1 | m31-5 | TFE | 50 | F-5 | H-5 | 270 | D-5 | 1.15 |
| Ex. 6 | m21-1 | m32-1 | — | 78 | F-6 | H-6 | 210 | D-6 | 1.35 |
| Ex. 7 | m22-1 | m11-1 | — | 100 | F-7 | H-7 | 235 | D-7 | 1.68 |
| Ex. 8 | m22-1 | m12-1 | — | 100 | F-8 | H-8 | 295 | D-8 | 1.41 |
| Ex. 9 | m11-1 | TFE | — | 38.5 | F-9 | H-9 | 280 | D-9 | 1.71 |
| Ex. 10 | m31-4 | TFE | — | 0 | F-10 | H-10 | 220 | D-10 | 1.10 |
| Ex. 11 | m24-1 | m32-1 | — | 0 | F-11 | H-11 | 200 | D-11 | 1.41 |

Ex. 12

To 10 g of the supported catalyst, 25 g of water was added, and ultrasonic waves were irradiated for 10 minutes to obtain a dispersion liquid of the catalyst. 1.6 g of the liquid composition (D-1) was added thereto, and further 28 g of ethanol was added to bring the solid content concentration to be 22 mass % to obtain a liquid for forming a catalyst layer. The liquid was applied on a separately prepared sheet made of a copolymer of ethylene and TFE (trade name: AFLEX 100N, manufactured by AGC Inc., thickness 100 μm) (hereinafter referred to as ETFE sheet), dried at 80° C. for 30 minutes and further heat-treated at 160° C. for 30 minutes, to form a catalyst layer in which the platinum amount was 0.2 mg/cm².

The liquid composition (D-1) was applied on an ETFE sheet by a die coater, dried at 80° C. for 30 minutes, and further heat-treated at 190° C. for 30 minutes, to form a polymer electrolyte membrane having a thickness of 17 μm.

After peeling the ETFE sheet from the polymer electrolyte membrane, the polymer electrolyte membrane was sandwiched between two catalyst layers provided with ETFE sheets, and heat-pressed under the conditions of a press temperature of 160° C., a press time of 5 minutes, and a pressure of 3 MPa, to bond the catalyst layers to both sides of the polymer electrolyte membrane, and the ETFE sheets were peeled off from the catalyst layers to obtain a membrane catalyst layer assembly having an electrode area of 25 cm².

On a gas diffusion layer made of carbon paper, a carbon layer composed of carbon and polytetrafluoroethylene was formed.

A membrane electrode assembly was obtained by sandwiching the membrane catalyst layer assembly by gas diffusion layers so that the carbon layer and the catalyst layer were in contact with each other.

Ex. 13 to 22

Membrane electrode assemblies were prepared by the same method as in Ex. 12, except that the liquid composition (D-1) used to form the catalyst layer was changed to the liquid compositions (D-2) to (D-11), respectively.

[Evaluation Test]
<Power Generation Efficiency>

The obtained membrane electrode assembly was incorporated into a power generation cell, and the following evaluation of the power generation efficiency was carried out.

The temperature of the membrane electrode assembly was maintained at 80° C., and hydrogen (utilization rate 70%) was supplied to the anode and air (utilization rate 50%) was supplied to the cathode, respectively, under pressure of 150 kPa (absolute pressure). Both hydrogen and air were supplied as humidified to a relative humidity of 30% RH, and the cell voltage at the time when the current density was 0.5 A/cm² was recorded and evaluated in accordance with the following standards. The results are shown in Table 2.

Here, if the evaluation result is at least B, it can be said that the power generation efficiency is excellent.

A: Cell voltage is at least 0.5 V.
B: Cell voltage is at least 0.45 V and less than 0.5 V.
C: Cell voltage is less than 0.45 V.

TABLE 2

| | Liquid composition used for forming electrolyte membrane | Power generation efficiency |
|---|---|---|
| Ex. 12 | D-1 | A |
| Ex. 13 | D-2 | A |
| Ex. 14 | D-3 | A |
| Ex. 15 | D-4 | A |
| Ex. 16 | D-5 | A |
| Ex. 17 | D-6 | B |
| Ex. 18 | D-7 | A |
| Ex. 19 | D-8 | A |
| Ex. 20 | D-9 | B |
| Ex. 21 | D-10 | C |
| Ex. 22 | D-11 | C |

As shown in Table 2, it has been confirmed that a fuel cell excellent in power generation efficiency can be obtained by using a catalyst layer comprising a supported catalyst having a carrier containing a metal oxide and a catalyst supported on the carrier, and a polymer having specific cyclic ether structural units and having ion exchange groups, in which the content of the specific cyclic ether structural units to all units which the polymer contains is at least 30 mol % (Ex. 12 to 20).

Whereas, it has been confirmed that the power generation efficiency of the fuel cell obtainable by using the polymer having no specific cyclic ether structural units, is inferior (Ex. 21 and 22).

This application is a continuation of PCT Application No. PCT/JP2020/000254, filed on Jan. 8, 2020, which is based upon and claims the benefit of priority from Japanese Patent Application No. 2019-001000 filed on Jan. 8, 2019. The contents of those applications are incorporated herein by reference in their entireties.

REFERENCE SYMBOLS

10: Membrane electrode assembly
11: Catalyst layer
12: Gas diffusion layer
13: Anode
14: Cathode
15: Polymer electrolyte membrane

What is claimed is:
1. A catalyst layer comprising
a supported catalyst having a carrier containing a metal oxide, and a catalyst supported on the carrier, and
a polymer having at least one type of units containing a cyclic ether structure, selected from the group consisting of units represented by the formula (u12) and units represented by the formula (u22), and having ion exchange groups,
wherein the total of the content of the units containing a cyclic ether structure is at least 30 mol % to all units which the polymer contains:

in the formula (u12), $R^{21}$ is a $C_{1-6}$ perfluoroalkylene group, or a $C_{2-6}$ perfluoroalkylene group having an ether-bonding oxygen atom between carbon-carbon bonds, and $R^{22}$ is a fluorine atom, a $C_{1-6}$ perfluoroalkyl group, a $C_{2-6}$ perfluoroalkyl group having an ether-bonding oxygen atom between carbon-carbon bonds, or a group represented by $-R^{21}(SO_2X(SO_2R^f)_a)^-M^+$, where $M^+$ is $H^+$, a monovalent metal cation, or an ammonium ion in which at least one hydrogen atom may be substituted by a hydrocarbon group, and $R^f$ is a linear or branched perfluoroalkyl group which may have an ether-bonding oxygen atom, X is an oxygen atom, a nitrogen atom, or a carbon atom, and when X is an oxygen atom, $a=0$, when X is a nitrogen atom, $a=1$, and when X is a carbon atom, $a=2$;
in the formula (u22), s is 0 or 1, $R^{51}$ and $R^{52}$ are each independently a fluorine atom, a $C_{1-5}$ perfluoroalkyl group, or a spiro ring formed by linking with each other (provided in the case where s is 0), $R^{53}$ and $R^{54}$ are each independently a fluorine atom, or a $C_{1-5}$ perfluoroalkyl group, and $R^{55}$ is a fluorine atom, a $C_{1-5}$ perfluoroalkyl group, or a $C_{1-5}$ perfluoroalkoxy group.

2. The catalyst layer according to claim 1, wherein the units containing a cyclic ether structure include the units represented by the formula (u22).

3. The catalyst layer according to claim 2, wherein the units containing a cyclic ether structure further include units represented by the formula (u12).

4. The catalyst layer according to claim 1, wherein the polymer further contains units based on a perfluoromonomer, and the units based on a perfluoromonomer are units not containing a cyclic ether structure and having an ion exchange group.

5. The catalyst layer according to claim 1, wherein the polymer further contains units based on tetrafluoroethylene.

6. A membrane electrode assembly comprising:
an anode having a catalyst layer,
a cathode having a catalyst layer, and
a polymer electrolyte membrane disposed between the anode and the cathode,
wherein at least one of the catalyst layer of the anode and the catalyst layer of the cathode is the catalyst layer as defined in claim 1.

7. The catalyst layer according to claim 1, wherein the units containing a cyclic ether structure include the units represented by the formula (u12).

8. The catalyst layer according to claim 1, wherein in the formula (u22) sis 1.

9. The catalyst layer according to claim 2, wherein in the formula (u22) s is 1.

* * * * *